(12) United States Patent
Eisenberg et al.

(10) Patent No.: US 7,729,299 B2
(45) Date of Patent: Jun. 1, 2010

(54) EFFICIENT ERROR RESPONSE IN A VIDEO CONFERENCING SYSTEM

(75) Inventors: Blane A. Eisenberg, Saratoga, CA (US); David J. Mackie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 432 days.

(21) Appl. No.: 11/738,218

(22) Filed: Apr. 20, 2007

(65) Prior Publication Data
US 2008/0259823 A1    Oct. 23, 2008

(51) Int. Cl.
*H04L 12/16* (2006.01)

(52) U.S. Cl. ............... 370/260; 370/389; 370/428

(58) Field of Classification Search ............... None
See application file for complete search history.

(56) References Cited

U.S. PATENT DOCUMENTS

| | | | |
|---|---|---|---|
| 4,888,797 A | 12/1989 | Strait, Jr. | 379/438 |
| 5,157,667 A | 10/1992 | Carusone, Jr. et al. | 714/45 |
| 6,070,072 A | 5/2000 | Dorenbosch et al. | 455/423 |
| 6,785,243 B2 | 8/2004 | Åberg | 370/252 |
| 6,983,409 B1 | 1/2006 | Vollmer | 714/748 |
| 2002/0054578 A1* | 5/2002 | Zhang et al. | 370/328 |
| 2005/0259682 A1* | 11/2005 | Yosef et al. | 370/468 |
| 2007/0121639 A1* | 5/2007 | Degrande et al. | 370/394 |
| 2008/0100694 A1* | 5/2008 | Barkley et al. | 348/14.08 |
| 2008/0239062 A1* | 10/2008 | Civanlar et al. | 348/14.09 |

OTHER PUBLICATIONS

"Advanced Media Transmission," University of Southern California, http://dmrl.usc.edu/project_xmission.html, 3 pages, Jan. 2003.
Zimmermann, "Streaming of DivX AVI Movies," Department of Computer Science, University of Southern California, 4 pages, 2003.
Zimmermann et al., "Retransmission-based error control in a many-to-many client-server environment," Integrated Media Systems Center, University of Southern California, pp. 1-11, 2003.

* cited by examiner

*Primary Examiner*—Daniel J Ryman
*Assistant Examiner*—Tito Pham
(74) *Attorney, Agent, or Firm*—Baker Botts L.L.P.

(57) ABSTRACT

Elements in a video conferencing system may respond to error message(s) by aggregating any related error messages and responding based on a severity of the error indicated by the related error messages. A multipoint control unit (MCU) may identify an active stream from a first endpoint and forward the active stream to a second endpoint. The active stream may include a plurality of packets and transmit a video image by sending a frame followed by sub-frame modifications. The MCU may receive an error message from the second endpoint and determine the error's severity, which is related to an impact on an displayed image. Based on the severity, the MCU may identify and send a set of correction packets to the second endpoint. Also, a third endpoint may receive the active stream and respond to one or more error messages received from the second endpoint.

16 Claims, 5 Drawing Sheets

EFFICIENT ERROR RESPONSE IN A VIDEO CONFERENCING SYSTEM

TECHNICAL FIELD OF THE INVENTION

The present invention relates generally to telecommunications and, more particularly, to efficient error response in a video conferencing system.

BACKGROUND OF THE INVENTION

Video conferences generally involve the transmission of audio, video, and/or data between endpoints located remotely from each other. This data is often transmitted as packets sent through one or multiple networks. For various reasons, networks are not one hundred percent reliable, and, thus, some packets fail to reach their intended destination. When this happens, an endpoint expecting to receive these lost packets may send an error message indicating that the packets were not actually received.

SUMMARY

In accordance with the present invention, techniques for efficient error response in a video conferencing system are provided. According to particular embodiments, these techniques describe a method of and device for responding to related error messages based on a severity of the error indicated by the error messages, where the error messages are sent by one or more requesting endpoints to indicate that the requesting endpoint(s) failed to receive one or more packets sent by an active endpoint during a video conference.

According to a particular embodiment, a method for responding to error messages received during a video conference comprises establishing a video conference between a plurality of endpoints and identifying an active stream comprising a plurality of packets received from a first one of the endpoints. The active stream transmits a video image by sending a frame followed by sub-frame modifications. The method further comprises forwarding the active stream to a second one of the endpoints, receiving an error message from the second endpoint indicating that the second endpoint did not receive a set of lost packets out of the plurality of packets, and determining a severity of an error indicated by the error message, where the severity is related to an impact on an image displayed at the second endpoint. Based on the severity, a set of correction packets to send to the second endpoint is identified, and the set of correction packets are sent to the second endpoint.

Embodiments of the invention provide various technical advantages. For example, these techniques may aggregate related error messages so that a single error response can be generated to address the error messages. By broadcasting a single error response to the endpoints that failed to receive one or more packets, network traffic may be decreased. In certain embodiments, a single set of correction packets is sent to the requesting endpoints to remedy the error. Rather than determining a response for each error message received, the responding device may aggregate related error messages received from multiple requesting endpoints and determine a single error response to the aggregated error message. This may increase the efficiency of the responding device and reduce network traffic. In particular embodiments, a responding device determines a severity of an error indicated by one or more error messages, thereby allowing the responding device to more appropriately respond to the error.

In some embodiments, a multipoint control unit (MCU) (sometimes referred to as a multipoint conference unit) responds to error messages sent to an active endpoint, which is streaming video, audio, and/or other data during a video conference. Allowing an MCU to respond in lieu of the active endpoint decreases the processing requirements of the active endpoint, reducing the chances that responding to an error will cause another error. Also, the MCU may have greater processing capabilities, and requiring the MCU to organize the error messages may permit the active endpoint to avoid greater processing and programming complexity. Also, in particular embodiments, the MCU forwards packets from the active endpoint to other endpoints in a video conference and buffers the most recently forwarded packets. Accordingly, after receiving an error message, the MCU may respond by simply accessing its packet buffer and resending the missed packets. In certain embodiments, endpoints receiving a stream of packets from an active endpoint efficiently address error messages sent by a requesting endpoint. This may reduce the latency of the error response as compared with obtaining packets from a remote active endpoint.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
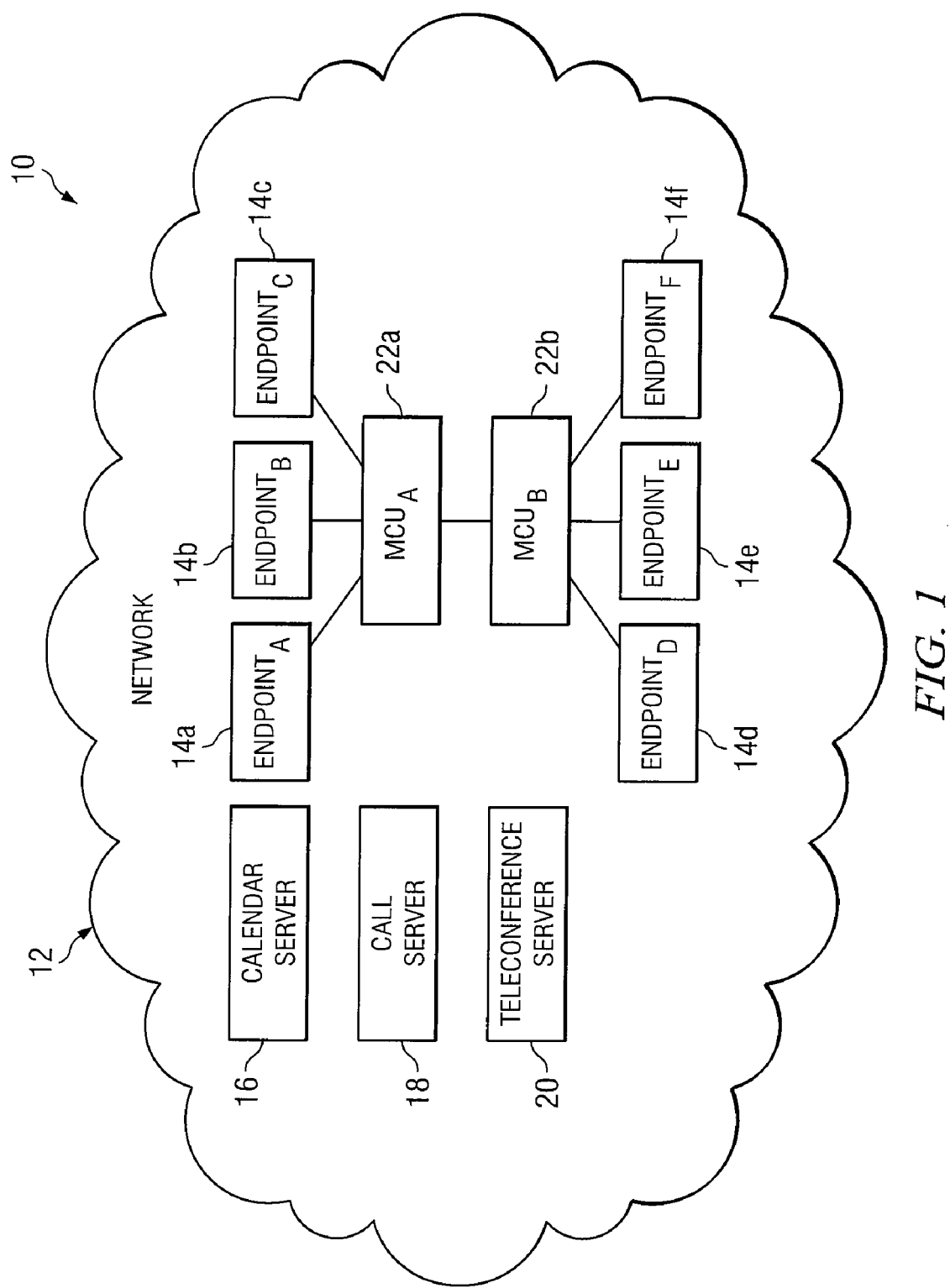
FIG. 1 illustrates a video conferencing system that efficiently responds to error messages.

FIG. 1 illustrates a video conferencing system, indicated generally at 10, that efficiently responds to error messages. As illustrated, video conferencing system 10 includes a network 12. Network 12 includes endpoints 14, a calendar server 16, a call server 18, a teleconference server 20, and multipoint control units (MCUs) 22 (sometimes referred to as a multipoint conference units). In general, elements within video conferencing system 10 interoperate to efficiently respond to error messages received during a video conference.

In particular embodiments, one of MCUs 22 responds to error messages sent to an active endpoint 14 from one or more requesting endpoints 14 based on the severity of the error indicated by the error messages. Requesting endpoints 14 are endpoints 14 that sent one or more error message(s) to active endpoint 14, even though those error messages may not constitute or include any sort of request. In various embodiments, requesting endpoints 14 are participants in a video conference and receive a video stream from active endpoint 14 and/or other endpoints 14. The error messages may indicate that the requesting endpoint(s) 14 failed to receive one or more packets sent by the active endpoint 14 during a video conference. In certain embodiments, MCU 22 aggregates related error messages received from one or more endpoints 14 and determines a set of correction packets to send to those endpoints 14.

Network 12 facilitates a video conference between endpoints 14 in video conferencing system 10. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software that may implement any suitable protocol or communications.

Endpoints 14 represent participants in a video conference. In the illustrated embodiment, video conferencing system 10 includes six endpoints 14. As illustrated, endpoints 14a, 14b, and 14c are connected to MCU 22a, while endpoints 14d, 14e, and 14f are connected to MCU 22b. Accordingly, MCU 22a and/or MCU 22b may establish a video conference between endpoints 14a, 14b, and 14c and 14d, 14e, and 14f. While video conferencing system 10 is illustrated as having this particular configuration, it is understood that video conferencing system 10 may include any suitable number of endpoints 14 having any suitable configuration.

A user of video conferencing system 10 may employ one of endpoints 14 in order to participate in a video conference. Each endpoint 14 may generate one or more audio, video, and/or data streams for use in the video conference. For example, endpoint 14a may generate two audio streams and two video streams, each stream conveying the sounds or image of a user participating in a video conference through endpoint 14a. Each endpoint 14 may also display or project one or more audio, video, and/or data streams for use in the video conference. For example, endpoint 14a may include two video screens each displaying an image conveyed by a received video stream and two speakers each projecting sounds conveyed by a received audio stream. In particular embodiments, at least two or more endpoints 14 contain three video screens each displaying an image from a received video stream and three cameras for generating and transmitting up to three video streams. Endpoints 14 may include any suitable telepresence equipment, for example, loud speakers, microphones, speaker phone, displays, cameras, and network interfaces. Also, endpoints 14 may include any suitable components and devices to establish and facilitate a video conference using any suitable protocol techniques or methods. For example, Session Initiation Protocol (SIP) or H.323 may be used. Additionally, endpoints 14 may support and be inoperable with other video systems supporting other standards such as H.261, H.263, and/or H.264.

Endpoints 14 may send video streams to other endpoints 14 while participating in a video conference. The video streams may each include a plurality of packets transmitting a video signal which is displayed by a requesting endpoint 14 as a video image. In particular embodiments, these packets may include an entire frame followed by one or more packets indicating sub-frame modifications to the frame. In certain embodiments, these sub-frame modifications include instructions to redraw a portion of the image or frame. As used herein, a "sub-frame" is a part of a frame, but less than the entire frame, e.g., a sub-frame may be one eighth of a frame. These sub-frame modifications may also include instructions to move a particular object to a different portion of the screen. It is to be understood that these sub-frame modifications may include any suitable information that updates the image displayed from the video stream that does not transmit information describing the entire image. This technique may have the advantage of requiring less bandwidth, as an active endpoint 14 need only transmit packets sufficient to indicate which portions of a displayed image have changed, rather than continuously retransmitting an entire frame for substantially the same image. However, this technique may have the disadvantage that missed packets may have a lasting impact on an image of the video signal displayed by a receiving endpoint 14.

Calendar server 16 allows users to schedule video conferences between one or more endpoints 14. Calendar server 16 may perform calendaring operations, such as receiving video conference requests, storing scheduled video conferences, and providing notifications of scheduled video conferences. In particular embodiments, a user can organize a video conference through calendar server 16 by scheduling a meeting in a calendaring application. The user may access the calendaring application through one of endpoints 14 or through a user's personal computer, cell or work phone, personal digital assistant (PDA) or any appropriate device. Calendar server 16 may allow an organizer to specify various aspects of a scheduled video conference such as other participants in the video conference, the time of the video conference, the duration of the video conference, and any resources required for the video conference. Once a user has scheduled a video conference, calendar server 16 may store the necessary information for the video conference. Calendar server 16 may also remind the organizer of the video conference or provide the organizer with additional information regarding the scheduled video conference.

Call server 18 coordinates the initiation, maintenance, and termination of certain audio, video, and/or data communications in network 12. In particular embodiments, call server 18 facilitates Voice-over-Internet-Protocol (VoIP) communications between endpoints 14. For example, call server 18 may facilitate signaling between endpoints 14 that enables packet-based media stream communications. Call server 18 may maintain any necessary information regarding endpoints 14 or other devices in network 12.

Teleconference server 20 coordinates the initiation, maintenance, and termination of video conferences between endpoints 14 in video conferencing system 10. Teleconference server 20 may access calendar server 16 in order to obtain information regarding scheduled video conferences. Teleconference server 20 may use this information to reserve devices in network 12, such as endpoints 14 and MCUs 22. Teleconference server 20 may decide which one or more MCUs 22 will establish a video conference and which endpoints 14 will connect to each of the allocated MCUs 22. For example, teleconference server 20 may use information regarding a scheduled video conference to determine that endpoints 14a, 14b, and 14e will be reserved from 4:00 p.m. EST until 5:00 p.m. EST for a video conference that will be established by MCU 22a. Teleconference server 20 may reserve various elements in network 12 (such as endpoints 14 and MCUs 22) prior to initiation of a video conference and may modify those reservations during the video conference. Additionally, in particular embodiments, teleconference server 20 is responsible for freeing resources after the video conference is terminated.

In the illustrated embodiment, teleconference server 20 has allocated MCU 22*a* and MCU 22*b* to the illustrated video conference involving endpoints 14*a*, 14*b*, 14*c*, 14*d*, 14*e*, and 14*f*. Teleconference server 20 has also determined that, in the illustrated video conference, MCU 22*a* will manage endpoints 14*a*, 14*b*, and 14*c* while MCU 22*b* will manage endpoints 14*d*, 14*e*, and 14*f*. Teleconference server 20 may also determine the particulars of how MCU 22*a* and MCU 22*b* interact and/or connect. For example, MCU 22*a* may be designated the "master" MCU, while MCU 22*b* operates as a "slave" MCU. While video conferencing system 10 is illustrated having a particular configuration for a given video conference between endpoints 14*a*, 14*b*, 14*c*, 14*d*, 14*e*, and 14*f*, it is to be understood that teleconference server 20 may initiate, maintain, and terminate a video conference between any endpoints 14 and any MCUs 22 in video conferencing system 10.

MCUs 22 may establish a video conference, control and manage endpoints 14 during the video conference, and facilitate termination of the video conference. MCUs 22 may manage which endpoints 14 participate in which video conferences. MCUs 22 may also control video, audio, and/or data streams sent to and from managed endpoints 14. In various embodiments, during a video conference, MCUs 22 aggregate the audio streams received from managed endpoints 14 and forward the aggregated audio stream to endpoints 14 and MCUs 22 participating in the video conference.

In particular embodiments, one of MCUs 22 may determine which video stream(s) to send to endpoints 14 during a video conference. This may be important, for example, when a limited bandwidth connection exists between MCU 22*a* and MCU 22*b*. MCU 22*a* may monitor audio streams received from endpoints 14*a*, 14*b*, and 14*c*. MCU 22*a* may then analyze these audio streams to determine which, if any, of endpoints 14*a*, 14*b*, and 14*c* currently have a user at that endpoint 14 who is verbally communicating (an active speaker). If an active speaker is identified at endpoint 14*b*, for example, MCU 22*a* may instruct endpoint 14*b*, an active endpoint 14, to continue transmitting video and audio streams while instructing endpoints 14*a* and 14*c* to transmit only audio streams. MCU 22*a* may forward to MCU 22*b* the video stream received from endpoint 14*b*, and MCU 22*b* may forward that video stream to endpoints 14*d*, 14*e*, and 14*f*. In certain embodiments, MCU 22*b* may have functionality similar or identical to MCU 22*a* and vice versa. While video conferencing system 10 is shown as containing two MCUs 22, it is understood that video conferencing system 10 may include any suitable number and configuration of MCUs 22.

MCUs 22 may respond to error messages on behalf of managed endpoints 14. Rather than forwarding one or more error messages to the endpoint 14 to which the error messages are directed, MCUs 22 may aggregate and respond to error messages. In certain embodiments, a destination address for an error message indicates the active endpoint 14, and one of MCUs 22, upon determining that the active endpoint 14 is a managed endpoint, intercepts and responds to the error message. In particular embodiments, an error message is sent directly to the responsible MCU 22. In certain embodiments, allowing MCUs 22 to respond in place of endpoints 14 decreases the processing requirements of endpoints 14. This may reduce the likelihood that a second error will be caused by an active endpoint 14 attempting to respond to multiple error messages regarding a first error while continuing to generate and transmit a video stream. Also, MCUs 22 may have greater processing capability, and allowing MCUs 22 to organize error messages may permit endpoints 14 to avoid greater processing and/or programming complexity. In particular embodiments, MCUs 22 buffer packets sent by active endpoint 14, and MCUs 22 access this buffer to determine a set of correction packets to send in response to the error messages. In certain embodiments, in order to generate an error response, MCUs 22 request information, such as a frame or sub-frame, from the active endpoint 14 to which the error messages were directed.

In operation, endpoints 14 participate in a video conference by transmitting a stream of packets of audio, video, and/or data through network 12 to others of endpoints 14 with MCUs 22 controlling this flow of media. For example, MCU 22*a* may establish a video conference with endpoints 14*a*, 14*b*, and 14*c* and MCU 22*b*, which may connect endpoints 14*d*, 14*e*, and 14*f* to the video conference. Endpoints 14*a*, 14*b*, and 14*c* may send one or more audio, video, and/or data streams to and receive one or more audio, video, and/or data streams from MCU 22*a*. MCU 22*a*, in turn, may send one or more audio, video, and/or data streams to and receive one or more audio, video, and/or data streams from MCU 22*b*, which sends one or more audio, video, and/or data streams to and receives one or more audio, video, and/or data streams from endpoints 14*d*, 14*e*, and 14*f*.

For a portion of the video conference, endpoint 14*a* may be designated an active endpoint 14 and may send a video stream to other endpoints 14. During transmission, certain packets may get lost in network 12 for a variety of different reasons. Endpoints 14*c*, 14*e*, and 14*f*, for example, may not receive those lost packets. Upon realizing that the lost packets have not been received, endpoints 14*c*, 14*e*, and 14*f* may each send, possibly at different times, one or more error messages to endpoint 14*a* indicating that the particular packets were not received by the respective requesting endpoint 14*c*, 14*e*, or 14*f*. These error messages may be sent through MCU 22*b* and received by MCU 22*a*. If these error messages were forwarded to endpoint 14*a*, endpoint 14*a* would likely receive and process each of these error messages at potentially different times, requiring system resources. Instead, MCU 22*a* may act as a proxy and respond to these error messages. MCU 22*a* may aggregate these related error messages and then evaluate these error messages to determine a severity of the error indicated by these related error messages. Based on the severity of the error, MCU 22*a* may determine an appropriate error response to send to those requesting endpoints 14*c*, 14*e*, and 14*f*, which may include sending a set of correction packets. MCU 22*a* may decide to: (1) resend the lost packets, (2) send a sub-frame to correct a portion of an image displayed by the requesting endpoint 14, or (3) send a frame to update an image displayed by the requesting endpoint 14. In particular embodiments, MCU 22*a* contains a packet buffer and a frame buffer, which may contain the lost packet(s), sub-frame(s), or a frame or which may contain information sufficient to generate the appropriate set of correction packets. However, if MCU 22*a* does not have the necessary information, MCU 22*a* may then send a request to endpoint 14*a* in order to obtain the necessary data. In some embodiments, MCU 22*a* aggregates related error messages and sends the active endpoint 14*a* a message requesting a set of correction packets sufficient to address the related error messages, thereby reducing the number of requests from MCU 22*a* that active endpoint 14*a* must address. Accordingly, error messages sent from multiple endpoints 14 are efficiently addressed by MCU 22*a* in a coordinated and organized fashion.

Particular embodiments of a video conferencing system 10 have been described and are not intended to be all inclusive.

While video conferencing system 10 is depicted containing a certain configuration and arrangement of elements and devices, it should be noted that this is a logical depiction and the components and functionality of video conferencing system 10 may be combined, separated, and distributed as appropriate both logically and physically. Also, the functionality of video conferencing system 10 may be provided by any suitable collection and arrangement of components. The functions performed by the elements within video conferencing system 10 may be accomplished by any suitable devices to efficiently respond to error messages received during a video conference.

Figure 2:
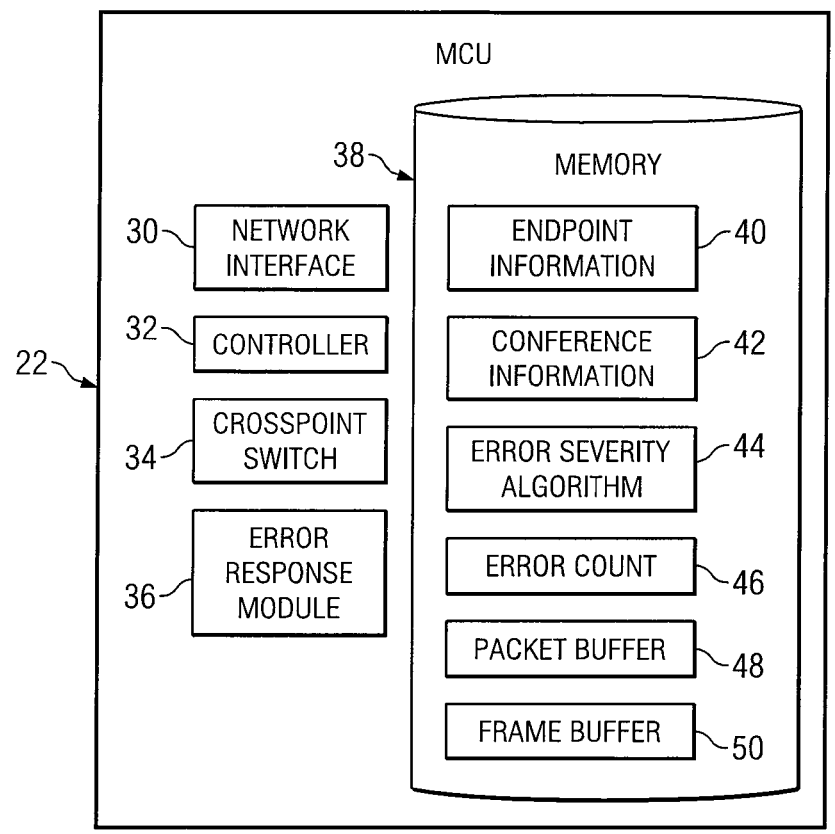
FIG. 2 illustrates a multipoint control unit (MCU) that efficiently responds to error messages by aggregating related error messages and determining a combined error response based on the severity of the error.

FIG. 2 illustrates a multipoint control unit (MCU), indicated at 22, that efficiently responds to error messages by aggregating related error messages and determining a combined error response based on the severity of an error indicated by the aggregated error message. In the illustrated embodiment, MCU 22 includes network interface 30, controller 32, crosspoint switch 34, error response module 36, and memory 38.

Network interface 30 supports communications with other elements of video conferencing system 10. Network interface 30 may interface with endpoints 14 and other MCUs 22. In particular embodiments, network interface 30 may comprise a wired ethernet interface. While described and illustrated as a single component within MCU 22, it is understood that this is a logical depiction. Network interface 30 may be comprised of any suitable components, hardware, software, and/or logic for interfacing MCU 22 with other elements of video conferencing system 10 and/or network 12. The term "logic," as used herein, encompasses both software and computer executable code that may be executed to perform operations.

In general, controller 32 controls the operations and functions of MCU 22. Controller 32 may process information received by MCU 22 through network interface 30. Controller 32 may also access and store information in memory 38 for use during operation. While depicted as a single element in MCU 22, it is understood that the functions of controller 32 may be performed by one or many elements. Controller 32 may have any suitable additional functionality to control the operation of MCU 22.

Crosspoint switch 34 generally allows MCU 22 to receive and to forward packets received from endpoints 14 and/or other MCUs 22 to endpoints 14 and/or other MCUs 22. In particular embodiments, MCU 22 receives packets in video, audio, and/or data streams from one or many endpoints 14 and forwards those packets to another MCU 22. Crosspoint switch 34 may select particular video streams to forward to endpoints 14 and/or other MCUs 22. In particular embodiments, crosspoint switch 34 determines an active endpoint 14 and forwards the video stream of the active endpoint 14 to other endpoints 14 and/or other MCUs 22. To determine an active endpoint 14, crosspoint switch 34 may analyze audio streams received from managed endpoints 14 to determine which endpoint 14 contains a user that is verbally communicating. That endpoint 14 may be designated the active endpoint 14, and the video stream of the active endpoint 14 may be forwarded to endpoints 14 and/or other MCUs 22 through crosspoint switch 34. Crosspoint switch 34 may also aggregate some or all audio streams received from endpoints 14 and/or other MCUs 22. Crosspoint switch 34 may contain hardware, software, logic, and/or any appropriate circuitry to perform these functions or any other suitable functionality. Additionally, while described as distinct elements within MCU 22, it is understood that network interface 30 and crosspoint switch 34 are logical elements and can be physically implemented as one or many elements in MCU 22.

Error response module 36 implements the error response functionality of MCU 22. Error response module 36 may receive and aggregate error messages destined for one or more managed endpoints 14. After aggregating those one or more error messages, error response module 36 may determine the severity of the error and, from that severity, determine the appropriate error response. In particular embodiments, error response module 36 responds to errors by generating a set of correction packets to send to the one or more endpoints 14 that sent the error message(s). These correction packets may include the missed packets, a sub-frame correction, or an entire frame. Error response module 36 may access memory 38 to determine whether or not memory 38 contains information sufficient to determine the correction packet(s). If the necessary information is not stored in memory 38, error response module 36 may, through network interface 30, send a query that requests the necessary information from the appropriate active endpoint 14. After obtaining this necessary information, error response module 36 may store that information in memory 38 and may send a set of correction packets to requesting endpoints 14 in response to the received error messages. Moreover, in some embodiments, MCU 22 receives, aggregates, and responds to error messages destined for endpoints 14 that are not managed by that MCU 22 and/or other MCUs 22. While depicted as a single element, error response module 36 may be comprised of one or many elements located in any suitable locations in MCU 22. In addition, error response module 36 may be comprised of any suitable hardware, software, components, and/or logic for responding to error messages received by MCU 22 on behalf of one or more endpoints 14.

Memory 38 stores data used by MCU 22. In the illustrated embodiment, memory 38 contains endpoint information 40, conference information 42, error severity algorithm 44, error count 46, packet buffer 48, and frame buffer 50. Endpoint information 40 and conference information 42 may include any suitable information regarding managed endpoints 14 and video conferences involving endpoints 14, respectively. For example, endpoint information 40 may store information regarding the number and type of endpoints 14 assigned to MCU 22 for a particular video conference. Endpoint information 40 may also specify the number of video, audio, and/or data streams, if any, to expect from a particular endpoint 14. Conference information 42 may contain information regarding scheduled or ad hoc video conferences that MCU 22 will establish or manage. For example, conference information 42 may include a scheduled start time and duration of a video conference and may include additional resources necessary for the video conference. It is to be understood that memory 38 may include any suitable information regarding endpoints 14, MCUs 22, and/or any other elements within video conferencing system 10.

Error severity algorithm 44 is used by error response module 36 to determine the severity of received error messages. Error severity algorithm 44 may include a number of different algorithms designed to be used for different types of situations. Alternatively, error severity algorithm 44 may include a single algorithm to be used by error response module 36. In particular embodiments, error response module 36 uses error severity algorithm 44 to determine whether an error indicated by related error messages is minor, moderate, or severe depending on the anticipated impact of the error on displayed images. Error severity algorithm 44 may specify a particular number of packets that need to be missed before a sub-frame or frame is sent in lieu of simply resending missed packets. Alternatively, error severity algorithm 44 may specify a more complex algorithm to determine when an error has a minor, moderate, or severe impact on an image displayed by a receiving endpoint 14. In certain embodiments, error severity algorithm 44 classifies errors into any number of categories, which may not include minor, moderate, and/or severe classifications. In general, error severity algorithm 44 includes any suitable information to be used by error response module 36 in order to determine the severity of the related error message(s).

Error count 46 may be included in memory 38 to track the number of errors received. Error count information 46 may include an indication of the number of error messages received by MCU 22 on behalf of each particular endpoint 14. Error response module 46 may include an indication of the number of error messages received by MCU 22 from a particular requesting endpoint. Error response module 36 may use error count 46 to determine when a video stream sent from a particular active endpoint 14 has caused too many error messages. In particular embodiments, error response module 36 uses error count 46 to determine whether an active endpoint 14 and/or a requesting endpoint 14 need to be disconnected from a video conference. A network administrator may also access error count 46 in order to analyze problems within network 12 and/or video conferencing system 10. Error count 46 may be used in order to diagnose and remedy problems.

Packet buffer 48 stores packets. Packet buffer 48 may contain a rolling window of the most recent packets sent by MCU 22. In particular embodiments, packet buffer 48 includes a rolling window of the 128 video packets most recently forwarded from an active endpoint 14 by MCU 22 to other endpoints 14 during a video conference. Packet buffer 48 may allow MCU 22 to quickly and easily access the most recent video packets sent by an active endpoint 14. In the case of a minor error, MCU 22 may, without notifying the active endpoint 14, access packet buffer 48, obtain the missed packets, and generate a set of correction packets including the missed packets. Frame buffer 50 stores sub-frames and frames. Frame buffer 50 may contain a rolling window of the most recent sub-frames and/or frames sent by MCU 22. In particular embodiments, MCU 22 buffers a frame in frame buffer 50 each time active endpoint 14 transmits a frame. In some embodiments, active endpoint 14 transmits a frame approximately once every five minutes. In certain embodiments, after MCU 22 determines a set of correction packets that includes a sub-frame or frame, MCU 22 stores the sub-frame or frame in frame buffer 50. In particular embodiments, frame buffer 50 comprises two buffers: one containing sub-frames and one containing frames.

In operation, MCU 22 responds to error messages received from requesting endpoints 14 on behalf of an active endpoint 14. MCU 22 receives and aggregates related error messages regarding active endpoint 14. For example, related error messages may be two error messages sent by requesting endpoint 14c and requesting endpoint 14f that indicate that some of the same packets were not received by these requesting endpoints 14. MCU 22 determines a severity of an error indicated by these error message(s). If the severity is low, MCU 22 may access packet buffer 48 to locate the missed packets. MCU 22 may construct a set of correction packets and send these packets to the requesting endpoints 14. If MCU 22 determines that the error is moderate or severe, MCU 22 may access frame buffer 50 to determine whether a particular sub-frame or frame is present in frame buffer 50. If that sub-frame or frame is not stored in frame buffer 50, then MCU 22 may query the active endpoint 14 requesting information sufficient to generate that particular sub-frame or frame. With the response from active endpoint 14, MCU 22 may construct a set of correction packets and send these packets to the requesting endpoints 14. MCU 22 may buffer the sub-frame or frame in frame buffer 50.

Particular embodiments of an MCU 22 have been illustrated and described and are not intended to be all inclusive. While MCU 22 is depicted as containing a certain configuration and arrangement of components, it should be noted that this is the logical depiction, and the components and functionality of MCU 22 may be combined, separated, and distributed as appropriate both logically and physically. The functionality of MCU 22 may be performed by any suitable components to efficiently respond to error messages.

Figure 3:
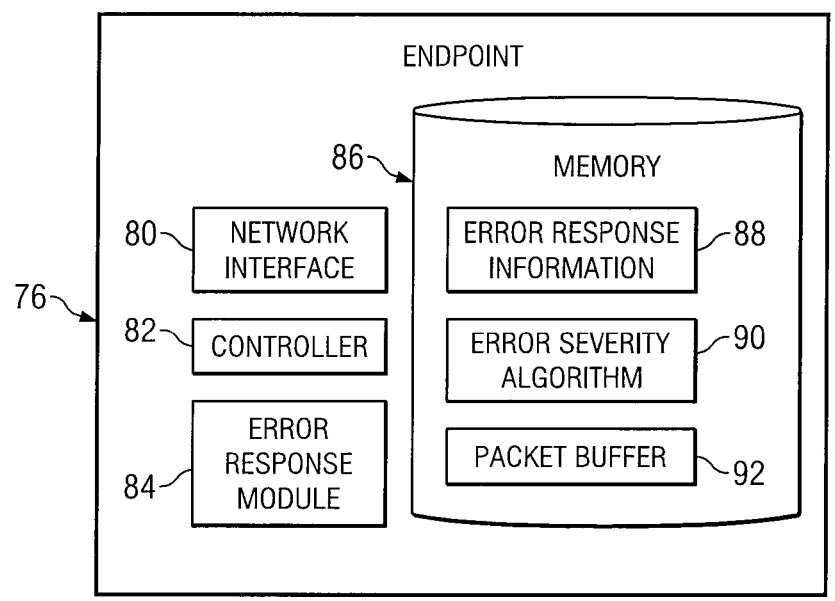
FIG. 3 illustrates a receiving endpoint that efficiently responds to error messages sent from a requesting endpoint.

FIG. 3 illustrates a receiving endpoint, indicated generally at 76, that efficiently responds to error messages sent from another receiving endpoint 14. In particular embodiments, a first receiving endpoint 14 fails to receive one or more packets sent by an active endpoint 14 during a video conference. Because of latency and bandwidth concerns, it may be beneficial to obtain those missed packets from a second receiving endpoint 76. In the illustrated embodiment, endpoint 76 includes a network interface 80, controller 82, error response module 84, and memory 86. While not illustrated, endpoint 76 may include a crosspoint switch and/or any other suitable components, such as video conferencing equipment.

Network interface 80 supports communications with other elements of video conferencing system 10. Network interface 80 may interface with other endpoints 14 and MCUs 22. In particular embodiments, network interface 80 may comprise any suitable wired or wireless networking components. While described and illustrated as a single component, it is understood that this is a logical depiction. Network interface 80 may be comprised of any suitable components, hardware, software, and/or logic for interfacing endpoint 76 with other elements of video conferencing system 10 and/or network 12.

In general, controller 82 controls the operations and functions of endpoint 76. Controller 82 may process information received by endpoint 76 through network interface 80. Controller 82 may also access and store information in memory 86 for use during operation. While depicted as a single element in endpoint 76, it is understood that the functions of controller 82 may be performed by one or many elements. Controller 82 may have any suitable additional functionality as necessary to control the operation of endpoint 76.

Error response module 84 implements the error response functionality of endpoint 76. Error response module 84 may receive and aggregate error messages received from one or more requesting endpoints 14. After aggregating the error messages, error response module 84 may determine the severity of the error and, from that severity, determine the appropriate error response. In particular embodiments, error response module 84 responds to minor and moderate errors by generating a set of correction packets to send to the requesting endpoints 14. Error response module 84 may access memory 86 to determine the set of correction packets. In the case of a severe error, error response module 84 may, through network interface 80, send an error message to active endpoint 14 on behalf of requesting endpoints 14. While depicted as a single element, error response module 84 may be comprised of one or many elements located in any suitable locations in endpoint 76. In addition, error response module 84 may be comprised of any suitable hardware, software, components, and/or logic for responding to error messages received by endpoint 76.

Memory 86 stores data used by endpoint 76. In the illustrated embodiment, memory 86 contains error response information 88, error severity algorithm 90, and packet buffer 92. While memory 86 is illustrated as containing specifically these components, it is to be understood that memory 86 may include any suitable information to be stored by endpoint 76.

Error response information 88 includes any information stored or used by error response module 84. In particular embodiments, error response information 88 stores an identification of local endpoints 14 that are participating in a particular video conference. Endpoint 76 may receive error messages from these local endpoints 14. In certain embodiments, error response information 88 stores an error count, which may be the same as or similar to error count 46. Endpoint 76 may use error count to determine when a requesting endpoint 14 has sent endpoint 76 an excessive number of error messages. Endpoint 76 may respond to this excessive error messaging by failing to respond to future error messages sent by that requesting endpoint 14. In some embodiments, error response information 88 includes information used by endpoint 76 when endpoint 76 sends an error message after detecting that one or more packets were not received.

Error severity algorithm 90 is used by error response module 84 to determine the severity of received error message(s). Error severity algorithm 90 may include a number of different algorithms designed to be used for different types of situations. Alternatively, error severity algorithm 90 may include a single algorithm to be used by error response module 84. In particular embodiments, error response module 36 uses error severity algorithm 90 to determine whether an error indicated by one or more error messages is minor, moderate, or severe. Error severity algorithm 90 may specify a particular number of packets that need to be lost before a sub-frame or frame is sent rather than resending missed packets. Alternatively, error severity algorithm 90 may specify a more complex algorithm to determine when an error has a minor, moderate, or severe impact on an image displayed at a requesting endpoint 14. In certain embodiments, error severity algorithm 90 classifies errors into any number of categories, which may or may not include minor, moderate, and/or severe classifications. In general, error severity algorithm 90 includes any suitable information to be used by error response module 84 in order to determine a severity of an error indicated by related error message(s).

Packet buffer 92 stores packets. Packet buffer 92 may contain a rolling window of the most recent packets received by endpoint 76. In particular embodiments, packet buffer 92 includes a rolling window of the most recent 128 video packets received from an active endpoint 14. Error response module 84 may access packet buffer 92 in order to determine a set of correction packets to send to one or more requesting endpoints 14.

In operation, endpoint 76 receives a video stream from an active endpoint 14 and responds to error messages received from other receiving endpoints 14. A requesting endpoint 14 may fail to receive one or more packets sent by an active endpoint 14 during a video conference. Because of latency and bandwidth concerns, it may be beneficial to obtain lost packets from receiving endpoint 76. Accordingly, endpoint 76 may receive one or more error messages from other endpoints 14 indicating that those endpoints 14 missed one or more packets sent by active endpoint 14. After aggregating any related error messages, receiving endpoint 76 may respond to these error messages based on a severity of the error indicated by the error messages. For example, the severity may be minor, moderate, or severe. If a minor error is encountered, endpoint 76 may locate the missed packets in packet buffer and may forward those packets to requesting endpoints 14. If, on the other hand, the error is moderate, endpoint 76 may determine a sub-frame from packet buffer 92 and/or a displayed image at endpoint 76. Finally, if the error is determined to be severe, endpoint 76 may be unable to provide the requested information to requesting endpoints 14. In this instance, endpoint 76 may send an error message to active endpoint 14 on behalf of requesting endpoints 14. Endpoint 76 may also notify requesting endpoints 14 that an error message has been sent to active endpoint 14. In particular embodiments, endpoint 76 simply forwards the error message received from requesting endpoints 14. In other embodiments, endpoint 76 generates an error message specifying all requesting endpoints 14 who suffered errors. Accordingly, the error message sent from endpoint 76 to active endpoint 14 may constitute an aggregated error message. In some embodiments, rather than sending a severe error message to endpoint 76, requesting endpoints 14 recognize the error as a severe error and send an error message directly to active endpoint 14.

While endpoint 76 is depicted as a single element containing a particular configuration and arrangement of modules, it should be noted that this is a logical depiction and the components and functionality of endpoint 76 may be combined, separated, and distributed as appropriate both logically and physically. Also the functionality of endpoint 76 may be provided by any suitable collection and arrangement of components. The functions performed by the various components within endpoint 76 may be accomplished by any suitable components to allow a receiving endpoint 76 to efficiently respond to error messages sent from another receiving endpoint 14. In certain embodiments, endpoint 14 and endpoint 76 may contain all, some, or none of the same functionality, configuration, and components.

Figure 4A:
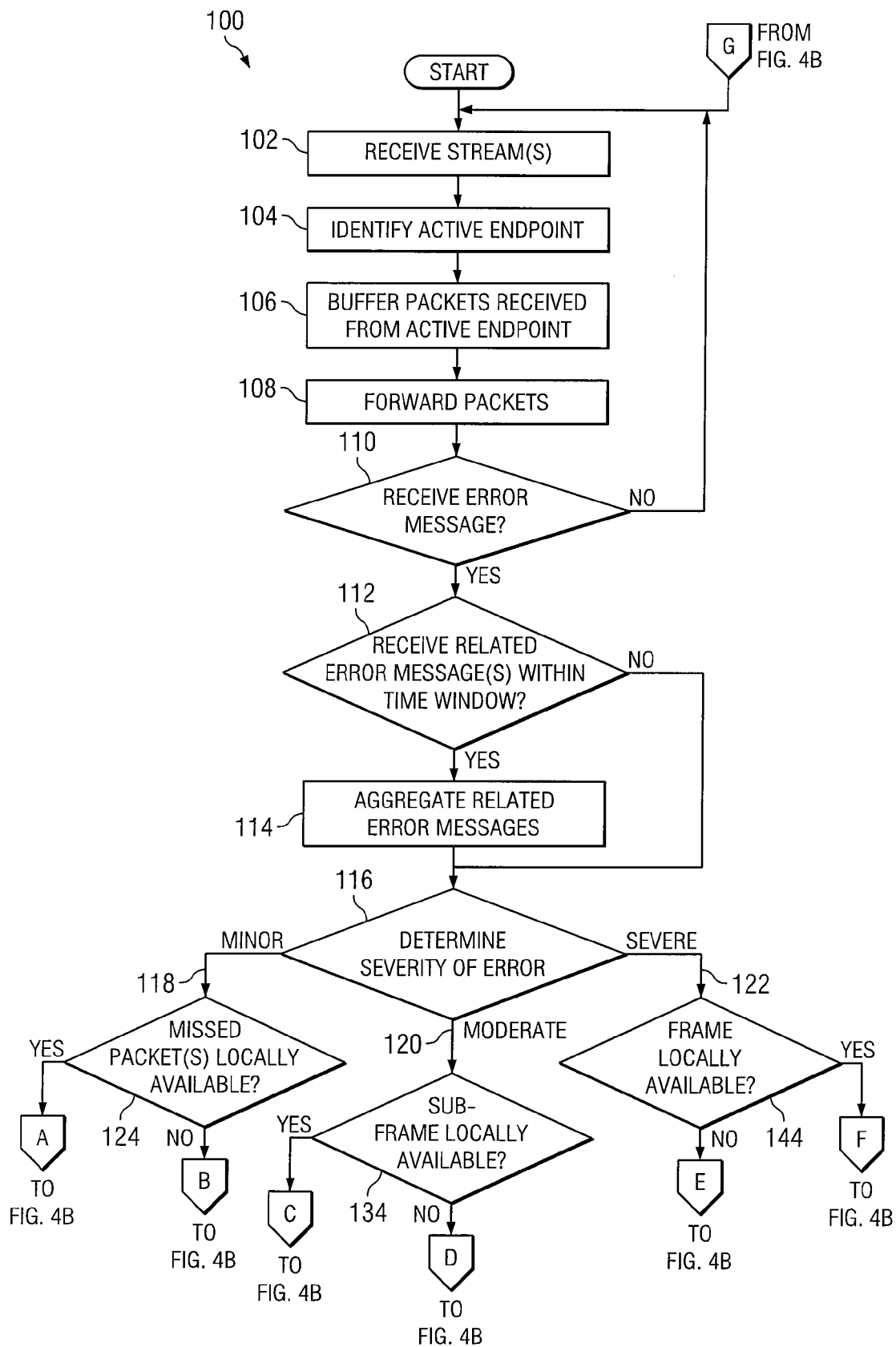
FIG. 4 is a flowchart illustrating a method of efficiently responding to error messages.
Figure 4B:
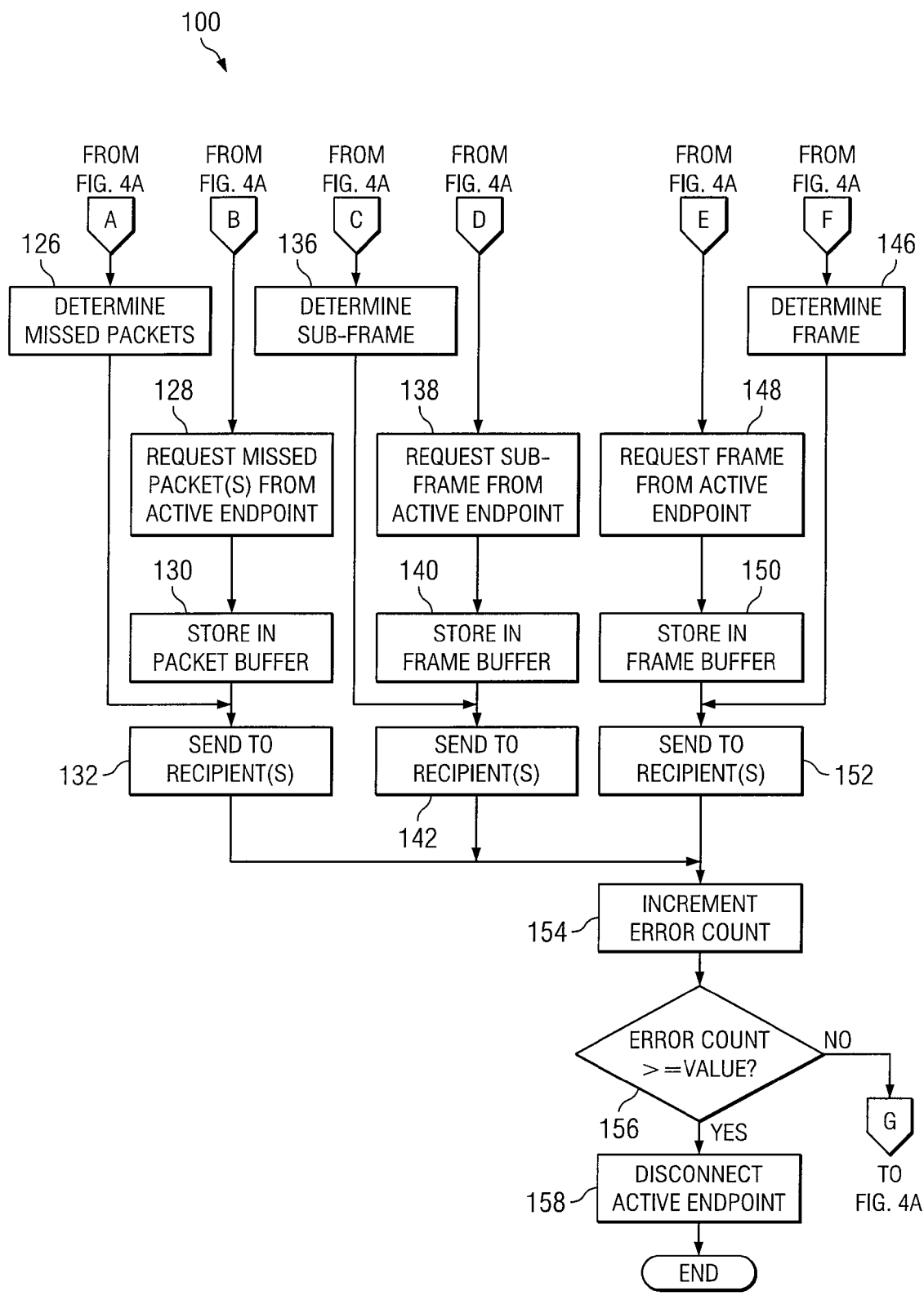

FIG. 4 is a flowchart illustrating a method 100 of efficiently responding to error messages. In particular embodiments, MCU 22 uses method 100 to aggregate related error messages and to determine a set of correction packets to send to requesting endpoints 14.

At step 102, MCU 22 receives a stream of packets from one or more endpoints 14. In particular embodiments, MCU 22 receives one or more streams from each endpoint 14, and these streams may include audio, video, and/or data streams. MCU 22 determines an active endpoint 14 in step 104. MCU 22 may determine the active endpoint 14 by using the received audio stream(s) to determine which endpoint 14 has an associated user that is verbally communicating in the video conference. That endpoint 14 may be identified as the active endpoint 14. At step 106, MCU 22 buffers video packets received from the active endpoint 14. Video packets may be buffered in packet buffer 48. At step 108, MCU 22 forwards the video packets received from active endpoint 14 to other endpoints 14 and/or other MCUs 22. MCU 22 may also forward one or more audio streams and/or an aggregated audio stream to endpoints 14 and/or other MCUs 22.

At step 110, MCU determines whether an error message has been received. If an error message has not been received, method 100 returns to step 102; otherwise, it continues to step 112, where MCU determines whether related error messages have been received within a particular window of time. This window of time may be a predetermined number of milliseconds or number of packets sent. In particular embodiments, the window of time is determined from the configuration of the video conference, the endpoints 14 involved in the video conference, the location of participating endpoints 14, or any other suitable parameters. Related error messages may be error messages that could be addressed with a common error response. If MCU 22 determines, in step 112, that no related error messages were received, method 100 proceeds to step 116. However, if, in step 112, MCU 22 determines that related error messages were received, method 100 proceeds to step 114, where MCU 22 aggregates these related error messages.

MCU 22 may aggregate related error messages to determine a summary of the errors suffered by requesting endpoints 14 so as to develop a common response to these errors. Then, at step 116, MCU 22 determines a severity of the error indicated by the error message(s). MCU 22 may evaluate information contained in the error message(s) in order to determine the severity. MCU 22 may determine an impact that the missing packets will have on an image displayed at a requesting endpoint 14. From step 116 method 100 can proceed through branch 118 for minor errors, branch 120 for moderate errors, or branch 122 for severe errors.

In branch 118, MCU 22 determines whether the missed packet(s) are locally available in step 124. If those missed packets are locally available, MCU 22 determines those missed packets in step 126. In particular embodiments, MCU 22 accesses packet buffer 48 in order to determine the missed packets. MCU 22 may create a set of correction packets based on these missed packets. If, in step 124, MCU 22 determined that the missed packets were not locally available, method 100 proceeds to step 128, where MCU 22 requests the missed packets from the active endpoint 14. In particular embodiments, active endpoint 14 obtains the missed packets from packet buffer 92 or another portion of memory 86. In some embodiments, MCU 22 requests other information from active endpoint 14 sufficient to generate a set of correction packets to send to requesting endpoints 14. At step 130, MCU 22 stores the packets received from the active endpoint 14 in packet buffer 48. From either step 126 or step 130, method 100 proceeds to step 132, where MCU 22 sends the correction packets to the requesting endpoints 14.

In branch 120, MCU 22 responds to a moderate error. At step 134, MCU 22 determines whether a sub-frame is locally available. In some embodiments, MCU 22 accesses frame buffer 50 in order to determine whether the sub-frame is stored in frame buffer 50. If MCU 22 determines that the sub-frame is locally available, method 100 proceeds to step 136, where MCU 22 determines the sub-frame, e.g., by extracting a copy from frame buffer 50. In particular embodiments, MCU 22 is able to reconstruct a sub-frame after evaluating packets or other information stored in packet buffer 48 and/or frame buffer 50. If, however, in step 134, MCU 22 determined that the sub-frame is not locally available, MCU 22 requests the sub-frame from active endpoint 14 in step 138. Active endpoint 14 may obtain the sub-frame in a variety of suitable ways. For example, active endpoint 14 may obtain the requested sub-frame from packet buffer 92 or any other suitable location in memory 38. Alternatively, active endpoint 14 may regenerate the requested sub-frame from an image currently received by a camera at active endpoint 14. At step 140, after receiving the sub-frame from the active endpoint 14, MCU 22 stores the sub-frame in frame buffer 50. Following either step 136 or step 140, MCU 22 sends the sub-frame to the requesting endpoints 14 in step 142.

In branch 122, MCU 22 responds to a severe error. At step 144, MCU 22 determines whether a frame is locally available. If the frame is locally available, for example in frame buffer 50, MCU 22 proceeds to step 146, where MCU 22 determines the frame. In particular embodiments, MCU 22 may determine the frame by merely extracting the frame from frame buffer 50. In other embodiments, MCU 22 may determine the frame after processing information stored in packet buffer 48 and/or frame buffer 50. If, however, the frame is not locally available, method 100 proceeds to step 148 where MCU 22 requests the frame from active endpoint 14. Active endpoint 14 may obtain the frame in a variety of suitable ways. For example, active endpoint 14 may obtain the requested frame from packet buffer 92 or any other suitable location in memory 38. Alternatively, active endpoint 14 may regenerate the requested frame from an image currently received by a camera at active endpoint 14. At step 150, after receiving the frame from active endpoint 14, MCU 22 stores the frame in frame buffer 50. From either step 146 or step 150, method 100 proceeds to step 152, where MCU 22 sends the frame to the requesting endpoints 14. In particular embodiments, the requesting devices include requesting MCUs 22. Accordingly, in steps 132, 142, and 152, MCU 22 may send the set of correction packets to requesting MCUs 22 and/or requesting endpoints 14.

From step 132, step 142, or step 152, method 100 proceeds to step 154, where MCU 22 increments the error count of active endpoint 14. Error count 46 may store this error count. In particular embodiments, a network administrator may access error count 46 in order to determine issues or problems in video conferencing system 10, network 12, endpoint(s) 14, and/or MCU(s) 22. At step 156, MCU 22 determines whether the error count of the active endpoint 14 is greater than or equal to a particular value. Error count 46 may also store this value. In other embodiments, the particular value may be calculated based on current network conditions. If the error count is not greater than or equal to the value, method 100 returns to step 102. Otherwise, method 100 proceeds to step 158, where MCU 22 disconnects active endpoint 14 from the video conference. In particular embodiments, MCU 22 has authority to automatically disconnect one of endpoints 14; however, in other embodiments, MCU 22 sends a message to teleconference server 20 or a network administrator indicating that one of endpoints 14 has encountered an excessive number of errors. Teleconference server 20 or the network administrator may then disconnect that one of endpoints 14. After step 158, the method ends.

The method described with respect to FIG. 4 is merely illustrative and it is understood that the manner of operation and devices indicating as performing the operations may be modified in any appropriate manner. While the method describes particular steps performed in a specific order, it should be understood that system 10 contemplates any suitable collection and arrangement of elements performing some, all, or none of the steps in any operable order. As described, method 100 determines whether errors fall into either a minor, moderate, or severe category; however, it is understood that MCU 22 may categorize errors into any suitable categories and number of categories. Additionally, while MCU 22 is described as performing the steps of method 100, it is understood that one of endpoints 14 may be operable to perform the functionality described.

Figure 5:
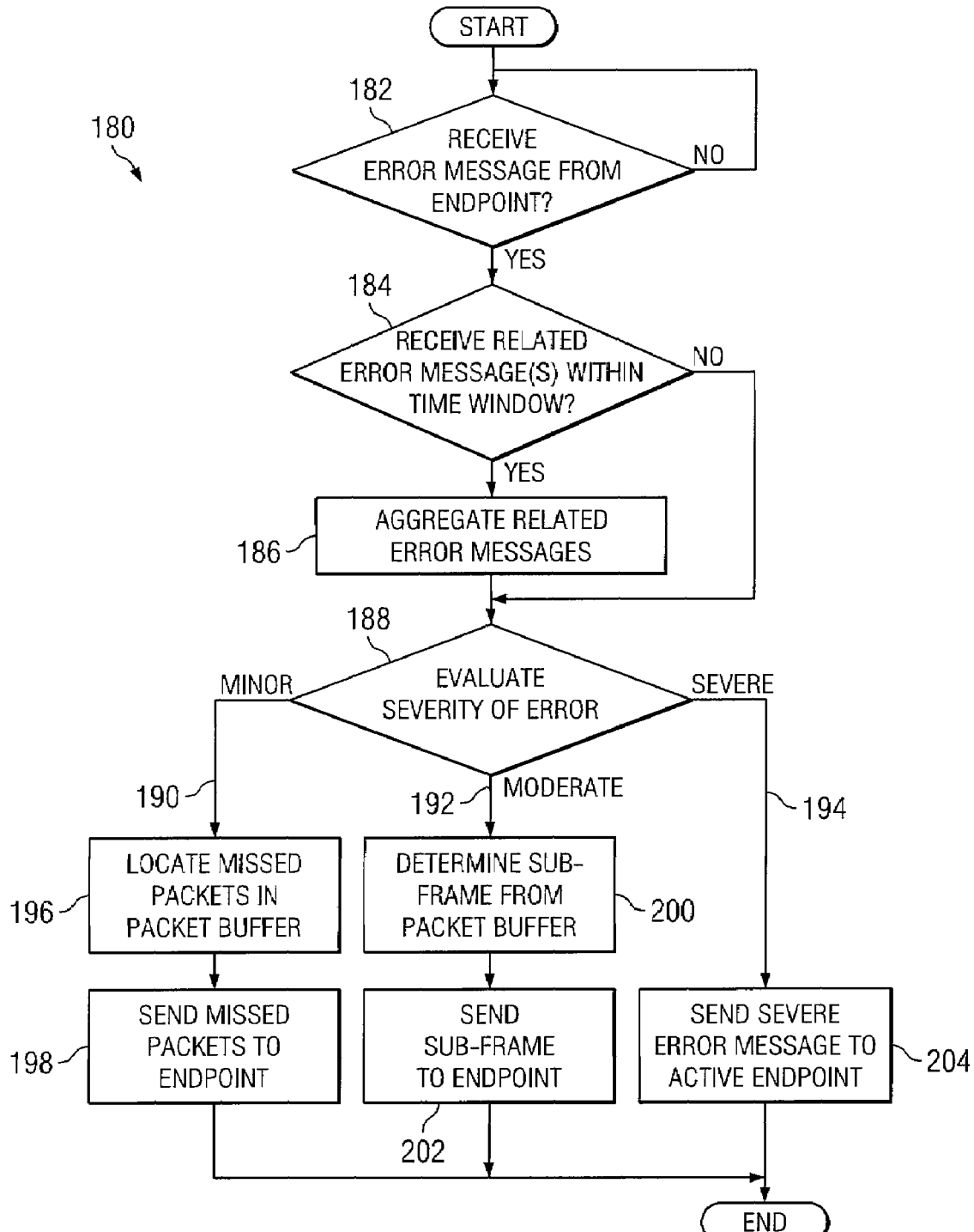
FIG. 5 is a flowchart illustrating a method whereby a receiving endpoint may efficiently respond to error messages sent from a requesting endpoint.

FIG. 5 is a flowchart illustrating a method 180 whereby a receiving endpoint 76 may efficiently respond to error messages sent from another receiving endpoint 14. In particular embodiments, a first receiving endpoint 14 fails to receive one or more packets sent by an active endpoint 14 during a video conference. Because of latency and bandwidth concerns, it may be beneficial to obtain those missed packets from a second receiving endpoint 76.

At step 182, endpoint 76 determines whether it has received an error message from another receiving endpoint 14. If not, method 180 returns to step 182. Otherwise, endpoint 76 determines whether related error messages are received within a window of time. If related error messages are received, endpoint 76 aggregates the related error messages in step 186 and proceeds to step 188. Otherwise, method 180 proceeds directly to step 188. At step 188, endpoint 76 evaluates the severity of the error. From step 116, endpoint 76 can follow branch 190 for minor errors, branch 192 for moderate errors, or branch 194 for severe errors.

In branch 190, endpoint 76 locates missed packets in the packet buffer in step 196. The packet buffer of endpoint 76 may be packet buffer 92. The error message or aggregated error messages may indicate specific packets that were not received by the requesting endpoint 14. At step 198, endpoint 76 sends those missed packets to the requesting endpoint(s) 14.

Alternatively, endpoint 76 takes branch 192 for moderate errors. At step 200, endpoint 76 determines a sub-frame from the packet buffer. The packet buffer of endpoint 76 may be packet buffer 92. In particular embodiments, endpoint 76 determines the sub-frame from information in packet buffer 92. In certain embodiments, endpoint 76 uses an image displayed by endpoint 76 to determine the sub-frame. In other embodiments, endpoint 76 does not store information sufficient to deal with moderate errors, and errors of a moderate severity are rerouted to branch 194 of method 180. At step 202, endpoint 76 sends the sub-frame to requesting endpoint (s) 14.

Finally, endpoint 76 may take branch 194 to respond to a severe error. A severe error may be an error that requires more information than endpoint 76 is able to provide. Accordingly, at step 204, endpoint 76 sends an error message to active endpoint 14 on behalf of requesting endpoint(s) 14. Active endpoint 14 may be the original sender of the lost packets. Endpoint 76 may also send a message to requesting endpoints 76 to indicate that the error was a severe error and was forwarded to active endpoint 14. From step 198, step 202, and step 204, the method ends.

The method described with respect to FIG. 5 is merely illustrative and it is understood that the manner of operation and devices indicated as performing the operations may be modified in any appropriate manner. While the method describes particular steps performed in a specific order, it should be understood that video conference system 10 contemplates any suitable collection and arrangement of elements performing some, all, or none of these steps in any operable order. Specifically, while endpoint 76 is described as responding to one or more error messages in one of three different ways, it is understood that endpoint 76 may address error messages in any suitable manner. For example, endpoint 76 may buffer any suitable number of packets and may be able to respond to any appropriate types of errors.

Although the present invention has been described in several embodiments, a myriad of changes and modifications may be suggested to one skilled in the art, and it is intended that the present invention encompass such changes and modifications as fall within the present appended claims.

What is claimed is:

1. A method for responding to error messages received during a video conference comprising:
    establishing a video conference between a plurality of endpoints;
    identifying an active stream comprising a plurality of packets received from a first one of the endpoints, the active stream transmitting a video image by sending a frame followed by sub-frame modifications;
    forwarding the active stream to a second one of the endpoints;
    buffering the packets received from the first endpoint in a packet buffer;
    receiving an error message from the second endpoint indicating that the second endpoint did not receive a set of lost packets out of the plurality of packets;
    determining a severity of an error indicated by the error message, wherein the severity is related to an impact on an image displayed at the second endpoint and the severity is classified as minor, moderate, or severe;
    based on the severity, identifying a set of correction packets to send to the second endpoint, wherein identifying the set of correction packets to send to the second endpoint comprises:
        if the severity is minor, locating the set of lost packets in the packet buffer;
        if the severity is moderate, determining whether a sub-frame is locally available and, if the sub-frame is not locally available, sending a query to the first endpoint requesting the sub-frame; and
        if the severity is severe, determining whether a frame is locally available and, if the frame is not locally available, sending a query to the first endpoint requesting the frame; and
    sending the set of correction packets to the second endpoint.

2. The method of claim 1, wherein the error message is a first error message, the method further comprising:
    forwarding the active stream to a third one of the endpoints;
    receiving a second error message from the third endpoint, the second error message related to the first error message;
    aggregating the first error message and the second error message, wherein determining the severity includes determining the severity for the error indicated by the aggregated error messages; and
    sending the set of correction packets to the third endpoint.

3. The method of claim 2, wherein the second error message indicates that the third endpoint did not receive the set of lost packets.

4. The method of claim 1, wherein:
    a destination address of the error message indicates the first endpoint; and
    receiving the error message comprises intercepting the error message before it reaches the destination address.

5. A method for responding to error messages received during a video conference comprising:
    participating in a video conference between a plurality of endpoints;
    receiving an active stream comprising a plurality of packets from a first one of the endpoints, the active stream transmitting a video image by sending a frame followed by sub-frame modifications;
    receiving an error message from a second one of the endpoints indicating that the second endpoint did not receive a set of lost packets out of the plurality of packets;
    determining a severity of an error indicated by the error message, wherein the severity is related to an impact on an image displayed at the second endpoint;
    if the severity is less than a threshold:
        based on the severity, identifying a set of correction packets to send to the second endpoint; and
        sending the set of correction packets to the second endpoint; and
    if the severity is not less than the threshold:
        sending an error notification to the first endpoint, the error notification specifying the second endpoint and the set of lost packets.

6. The method of claim 5, wherein the error message is a first error message, further comprising:
    receiving a second error message from a third endpoint, the second error message related to the first error message;
    aggregating the first error message and the second error message, wherein determining the severity includes determining the severity for the error indicated by the aggregated error messages; and if the severity is less than the threshold, sending the set of correction packets to the third endpoint;

wherein the error notification further specifies the third endpoint.

7. The method of claim 6, further comprising:

buffering the packets received from the first endpoint in a packet buffer;

wherein identifying the set of correction packets comprises locating the set of lost packets in the packet buffer.

8. A device for responding to error messages received during a video conference comprising:

a controller operable to establish a video conference between a plurality of endpoints;

a crosspoint switch operable to identify an active stream comprising a plurality of packets received from a first one of the endpoints and to forward the active stream to a second one of the endpoints, the active stream transmitting a video image by sending a frame followed by sub-frame modifications;

a packet buffer buffering the packets received from the first endpoint;

an error response module operable:

to receive an error message from the second endpoint indicating that the second endpoint did not receive a set of lost packets out of the plurality of packets;

to determine a severity of an error indicated by the error message, wherein the severity is related to an impact on an image displayed at the second endpoint and the severity is classified as minor, moderate, or severe;

based on the severity, to identify a set of correction packets to send to the second endpoint, wherein identifying the set of correction packets to send to the second endpoint comprises:

if the severity is minor, locating the set of lost packets in the packet buffer;

if the severity is moderate, determining whether a sub-frame is locally available and, if the sub-frame is not locally available, sending a query to the first endpoint requesting the sub-frame; and if the severity is severe, determining whether a frame is locally available and, if the frame is not locally available, sending a query to the first endpoint requesting the frame; and to send the set of correction packets to the second endpoint.

9. The device of claim 8, wherein:

the error message is a first error message;

the crosspoint switch is further operable to forward the active stream to a third one of the endpoints; and the error response module is further operable to receive a second error message from the third endpoint, the second error message related to the first error message, to aggregate the first error message and the second error message, and to send the set of correction packets to the third endpoint, wherein determining the severity includes determining the severity for the error indicated by the aggregated error messages.

10. The device of claim 9, wherein the second error message indicates that the third endpoint did not receive the set of lost packets.

11. The device of claim 8, wherein:

a destination address of the error message indicates the first endpoint; and receiving the error message comprises intercepting the error message before it reaches the destination address.

12. Logic for responding to error messages received during a video conference, the logic encoded in tangible computer readable media and operable when executed to:

establish a video conference between a plurality of endpoints;

identify an active stream comprising a plurality of packets received from a first one of the endpoints, the active stream transmitting a video image by sending a frame followed by sub-frame modifications;

forward the active stream to a second one of the endpoints;

buffer the packets received from the first endpoint in a packet buffer receive an error message from the second endpoint indicating that the second endpoint did not receive a set of lost packets out of the plurality of packets;

determine a severity of an error indicated by the error message, wherein the severity is related to an impact on an image displayed at the second endpoint and the severity is classified as minor, moderate, or severe;

based on the severity, identify a set of correction packets to send to the second endpoint, wherein identifying the set of correction packets to send to the second endpoint comprises:

if the severity is minor, locating the set of lost packets in the packet buffer;

if the severity is moderate, determining whether a sub-frame is locally available and, if the sub-frame is not locally available, sending a query to the first endpoint requesting the sub-frame; and if the severity is severe, determining whether a frame is locally available and, if the frame is not locally available, sending a query to the first endpoint requesting the frame; and send the set of correction packets to the second endpoint.

13. The logic of claim 12, wherein the error message is a first error message, the logic further operable to:

forward the active stream to a third one of the endpoints;

receive a second error message from the third endpoint, the second error message related to the first error message;

aggregate the first error message and the second error message, wherein determining the severity includes determining the severity for the error indicated by the aggregated error messages; and send the set of correction packets to the third endpoint.

14. The logic of claim 13, wherein the second error message indicates that the third endpoint did not receive the set of lost packets.

15. The logic of claim 12, wherein:

a destination address of the error message indicates the first endpoint; and receiving the error message comprises intercepting the error message before it reaches the destination address.

16. A system for responding to error messages received during a video conference comprising:

means for establishing a video conference between a plurality of endpoints;

means for identifying an active stream comprising a plurality of packets received from a first one of the endpoints, the active stream transmitting a video image by sending a frame followed by sub-frame modifications;

means for forwarding the active stream to a second one of the endpoints;

means for buffering the packets received from the first endpoint in a packet buffer;

means for receiving an error message from the second endpoint indicating that the second endpoint did not receive a set of lost packets out of the plurality of packets;

means for determining a severity of an error indicated by the error message, wherein the severity is related to an impact on an image displayed at the second endpoint and the severity is classified as minor, moderate, or severe;

means for, based on the severity, identifying a set of correction packets to send to the second endpoint, wherein identifying the set of correction packets to send to the second endpoint comprises:

if the severity is minor, locating the set of lost packets in the packet buffer;

if the severity is moderate, determining whether a sub-frame is locally available and, if the sub-frame is not locally available, sending a query to the first endpoint requesting the sub-frame; and if the severity is severe, determining whether a frame is locally available and, if the frame is not locally available, sending a query to the first endpoint requesting the frame; and means for sending the set of correction packets to the second endpoint.

* * * * *